(12) United States Patent
Kassler et al.

(10) Patent No.: US 8,213,002 B2
(45) Date of Patent: Jul. 3, 2012

(54) PON TESTER

(75) Inventors: Harlan Kassler, Austin, TX (US); Seymour Goldstein, Austin, TX (US)

(73) Assignee: Fluke Corporation, Everett, WA (US)

( * ) Notice: Subject to any disclaimer, the term of this patent is extended or adjusted under 35 U.S.C. 154(b) by 337 days.

(21) Appl. No.: 12/471,744

(22) Filed: May 26, 2009

(65) Prior Publication Data

US 2010/0225901 A1 Sep. 9, 2010

Related U.S. Application Data

(60) Provisional application No. 61/157,510, filed on Mar. 4, 2009.

(51) Int. Cl.
*G01N 21/00* (2006.01)

(52) U.S. Cl. .......................... 356/73.1; 398/25

(58) Field of Classification Search .................. 356/73.1
See application file for complete search history.

(56) References Cited

U.S. PATENT DOCUMENTS

| | | | |
|---|---|---|---|
| 5,465,143 A | 11/1995 | Chu et al. | |
| 5,754,284 A | 5/1998 | Leblanc et al. | |
| 6,122,043 A * | 9/2000 | Barley | 356/73.1 |
| 6,924,890 B1 | 8/2005 | Vobian et al. | |
| 7,070,342 B2 * | 7/2006 | Bush et al. | 385/96 |
| 2002/0101577 A1 | 8/2002 | Thwing et al. | |
| 2005/0110979 A1 | 5/2005 | Harres | |
| 2005/0128466 A1 | 6/2005 | Shyu | |
| 2008/0231842 A1 | 9/2008 | Brendel | |
| 2009/0040509 A1 | 2/2009 | Goldstein et al. | |

FOREIGN PATENT DOCUMENTS

GB 2453838 A 4/2009

OTHER PUBLICATIONS

Analog Devices Data Sheet for the Product "Dual, Ultralow Noise Variable Gain Amplifier AD604". pp. 1-32. Available in 1996.*
Infineon Technologies Data Sheet for the Product "Low Power BIDI Optical Standard Module 1310 nm Emitting, 1310 nm Receiving SBL52214x". pp. 1-12. Available 2002.*
Texas Instruments Data Sheet for the Product "Wideband, High Gain Voltage Limiting Amplifier OPA699". pp. 1-27. Available 2002, Revised 2003.*

* cited by examiner

*Primary Examiner* — Tarifur Chowdhury
*Assistant Examiner* — Tara S Pajoohi
(74) *Attorney, Agent, or Firm* — patenttm.us

(57) ABSTRACT

A high resolution optical fiber length meter, live fiber detector, and reflectance tester (instrument) for single mode applications using a low power, long wavelength laser for generating wide and narrow optical pulses that are launched into a single mode fiber under test. The laser output fiber pigtail is fusion spliced to a singlemode coupler whose output is coupled to the instrument bulkhead connector. A PIN photodiode is fusion spliced to the singlemode coupler to receive the reflected light from the fiber under test. The high resolution hand-held instrument is useful in examining singlemode passive optical networks (PON).

22 Claims, 7 Drawing Sheets

PON TESTER

BACKGROUND OF THE INVENTION

This invention relates to optical time domain reflectometry and more specifically to a subset of a micro hand-held instrument used for examination of singlemode optical fibers in passive optical networks (PON).

Optical time domain reflectometers (OTDR) are used in the telecommunications industry for testing, troubleshooting, and characterizing fiber optic cables to measure fiber cabling properties such as breaks, connector loss, splice loss, fiber attenuation, attenuation coefficients, fiber length, and other parameters that affect the signal transmission quality through the cable.

In examining a fiber with an OTDR, optical pulses are launched into the fiber under test from a pulsed laser diode at a low duty cycle. During the time between the optical pulses transmitted, returned light from the fiber under test is reflected back in the form of backscatter and reflections associated with events, such as connectors, and is then converted to an electrical signal, and processed for display. The signal is displayed as an amplitude in decibels versus a length plot showing a gradually decreasing backscatter energy level with reflective events appearing as pulses on the backscatter.

There are two major types of instruments using OTDR technology. The first is the fully functional mini-OTDR and the second is the reduced functionality optical fault finder. Both use backscatter, reflection of signals or waves back to their source, to make measurements. A third type of instrument using OTDR technology is the reflection finder that does not use backscattering. This type of instrument is very low cost, has relatively high spatial resolution but can not locate non reflective events such as an open APC (angle polish connector).

The mini-OTDR is a more complicated, higher cost instrument used by trained technicians to troubleshoot fiber cables. During the PON installation, mini-OTDRs are deployed to verify that proper installation was done during the construction phase and that quality of service is high. These OTDRs have high dynamic range needed to overcome the loss of the optical splitters used to distribute feeder fibers to individual customers. These OTDRs also have high spatial resolution so that the reflectance emanating from each customer's optical network terminal can be separated and measured. The design tradeoffs of an optical fault finder, such as trading off cost reduction for spatial resolution, make this type of instrument not a good alternative for PON testing. The third type of tester not using backscatter has the disadvantage of only finding reflections along a fiber. While this is useful for locating a fault, it does not provide enough information to make this type of tester viable for PON testing. In the PON network it is required to make measurements with backscatter such as locating an open APC. An APC provides little if any reflectance. Normally, an open connector having a different type of polish such as ultra physical contact (UPC) will provide a very strong reflection. In PON, an open APC at a distribution point must be identified.

There is a need for an easy to use, low cost, high resolution, palm-size instrument for testing singlemode PON networks between the customer and the first distribution point that provides connectivity information or the location of an open. This instrument could be used after the construction phase, during maintenance, or for simple troubleshooting. It could be more widely deployed, requiring less skill to operate. The skilled OTDR technician would only be needed to handle the more complicated problems.

SUMMARY OF THE INVENTION

In accordance with the invention, a high resolution optical fiber length meter, live fiber detector, and reflectance tester for single mode fiber examination in a singlemode PON cabling system is provided, having a low power, long wavelength optical source, that generates optical power in the form of narrow pulses for testing reflectance and wide optical pulses for testing APC connectors. A singlemode coupler distributes the outbound and inbound optical energy. An optical detector compatible with the low power, long wavelength optical source is coupled to the singlemode coupler to receive reflected light from the fiber under test.

Accordingly, it is an object of the present invention to provide an improved test instrument for passive fiber optic networks.

It is a further object of the present invention to provide an improved fiber optic network test instrument in a hand-held configuration.

It is yet another object of the present invention to provide an improved fiber optic test instrument that is low cost and employs backscatter to find APC connectors and locates reflections in a fiber under test.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a palm-sized test instrument based on OTDR technology for testing singlemode PON. The instrument can measure the length of a fiber terminated with either an APC (angled polish connector) or a standard connector (i.e. UPC), the distance to a fiber break, and detect live traffic. The instrument can be used to test for connectivity and network problems. The tester operates by automatically making three measurements. First, using a photodiode it measures the power on the fiber under test to determine if the fiber is "live." Secondly it measures backscatter with a wide pulse.

Finally, it uses a narrow pulse with a short deadzone to make measurements of reflections and uses a calibrated gain difference to measure reflectance.

Figure 1:
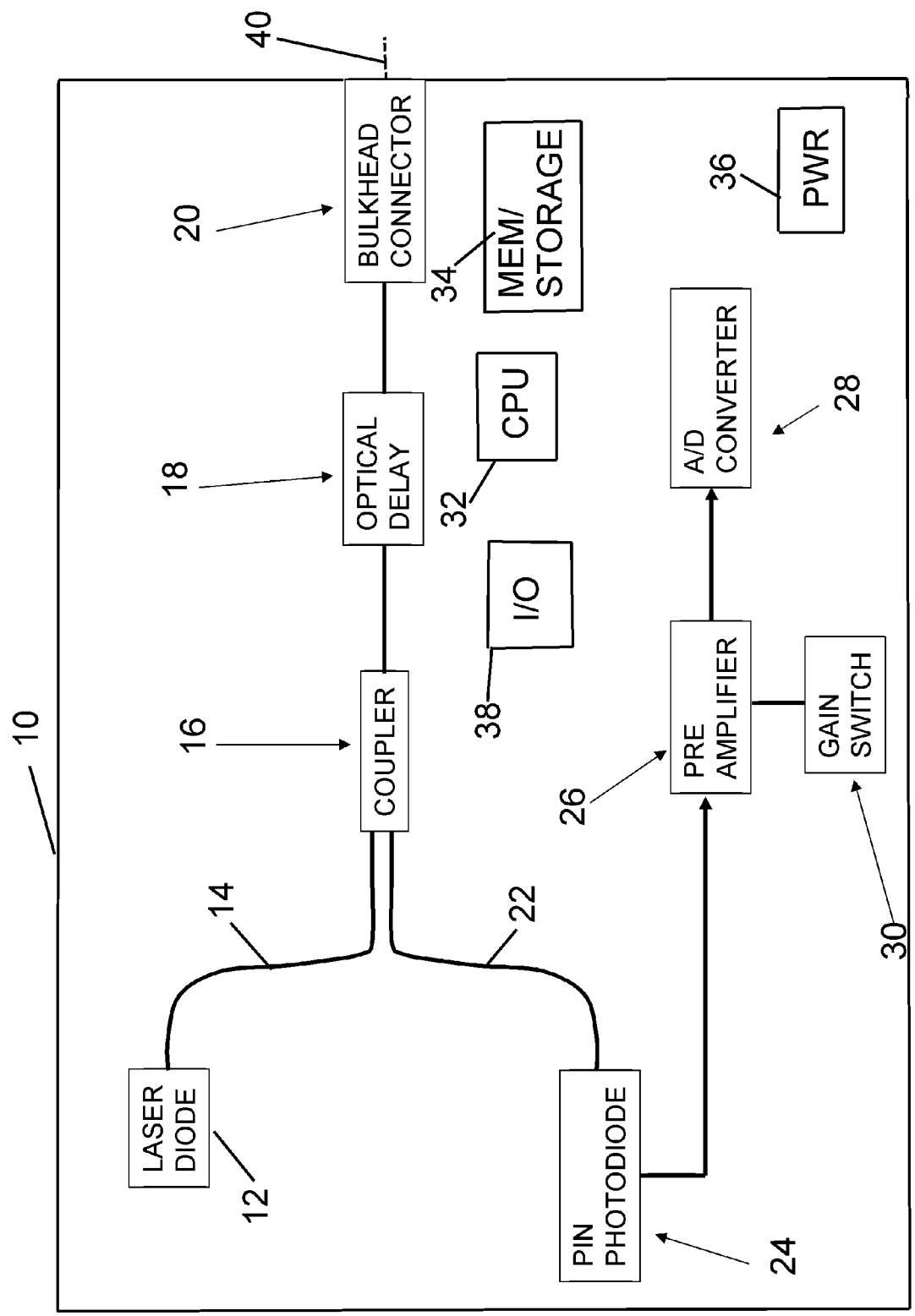
FIG. 1 is an optical topology block diagram of an instrument in accordance with the present invention.

Referring to FIG. 1, an optical topology block diagram of an instrument 10 in accordance with the present invention, the high resolution optical fiber meter 10 of the present invention is designed for examining single mode optical fibers in short range telecommunication systems, such as a PON network where fiber connectors are not closely spaced. In order to detect a problem such as an open in the network, it is important that the test instrument be able to work in both the backscatter and reflection finding modes. The optical topology shown in FIG. 1 comprises a low power, long wavelength optical source 12 coupled by a singlemode optical fiber 14 to a coupler 16 whose output fiber is an optical delay 18 which is terminated at the bulkhead connector 20. The singlemode optical coupler 16 has the second input port terminated via fiber 22 to a PIN photodiode 24. The PIN photodiode operates as an optical detector to convert the reflected light to electrical energy which is supplied to and then amplified by the operational amplifier 26 (pre-amplifier) whose gain can be varied from a high to a low state (by operation of gain switch 30) used for either detecting backscattering or reflections without backscattering. An analog to digital converter 28 transforms the analog signal to a digital signal that is then signal averaged to improve the signal to noise ratio.

One or more microprocessors (CPU 32) control operation of the device, with memory/storage 34 for data and command storage. Power block 36 provides the power source to operate the instrument, suitably battery power for portably hand-held use. I/O 38 provides interface with the user of the device, and may include a display and input devices, such as cursor control keys and other keys for allowing user operation and display/output of results.

In a preferred embodiment, the optical source 12 is a 1310 nm long wavelength laser diode mounted on a printed circuit board pigtailed with a singlemode fiber. The 1310 nm laser 12 transmits low power optical pulses in the range of 25 mW to 50 mW with pulse durations varying from 5 ns to up to 1 us. The duty cycle of the pulses is less than 1%. The optical power from the laser 12 is coupled to the input port of singlemode coupler 16 via the singlemode fiber pigtails of the laser and coupler using a fusion splice. The singlemode coupler is a fused biconic device that is designed to equally distribute the optical power of each leg of the device.

The singlemode coupler output port has an optical delay 18 between the coupler 16 and the bulkhead connector 20 to create separation between and laser pulse trigger switching noise and the first reflected pulse emanating from the bulkhead. This is needed if while testing, there is a reflective event near the instrument. One possible manner of providing the optical delay is providing a length of single mode optical fiber attached to the output port of the singlemode optical coupler and the output fiber connector. The optical energy from the laser 12 is launched into the fiber under test 40 via the bulkhead connector 20, which comprises the output fiber connector for the test instrument.

The light reflected from the fiber under test is coupled through the singlemode coupler 16 and directed to the PIN photodiode 24. The optical detector 24 is an InGaAs type device that is compatible with the 1310 nm wavelength light generated by laser 12. A PIN photodiode is used in the preferred embodiment because it doesn't require the complexity, space, temperature compensation, and cost as does an APD (avalanche photo detector) commonly used in OTDRs to improve receiver sensitivity. Since less dynamic range is needed for the short 2 km to 3 km fiber cabling in the typical test environment of this device, the PIN photodiode is preferred. In addition, the storage effects of PIN detectors are less than the storage effects of single mode detectors such as InGaAs APDs, producing a smaller detector tail on the falling edge of reflection pulses associated with events thus increasing the event resolution of the instrument.

The photodiode 24 is connected to the pre amplifier 26 in a transimpedance configuration to improve speed of response. The op amp used in pre amplifier 26 preferably has a very fast overload response so that a received strong reflection does not cause pulse spreading and recovery as an op amp without this feature would exhibit. An OPA699 Wideband, High Gain Voltage Limiting Amplifier from Texas Instruments is one such device that has output voltage clamping with recovery of less than a few nanoseconds. A few nanoseconds in a time or distance measurement represents fractions of a meter. A 10 ns recovery represents a 1 meter distance. The photodiode 24 uses a dual gain switching method for amplifying either backscattered signals or reflection signals. Since backscatter signals are at least 45 dB below the reflectance peaks a large difference in pre amplifier gains is needed. In this case a 200 k Ohms gain setting resistor for the pre-amplifier is adequate to detect enough backscatter while maintaining a respectable bandwidth. For higher resolution and lower gain, a 4 k Ohm gain setting resistor is sufficient. The preamplifier 26 output is then fed into a low cost A/D converter 28 so that further digital signal processing can continue such as converting to the log domain, signal averaging, and display.

Figure 2:
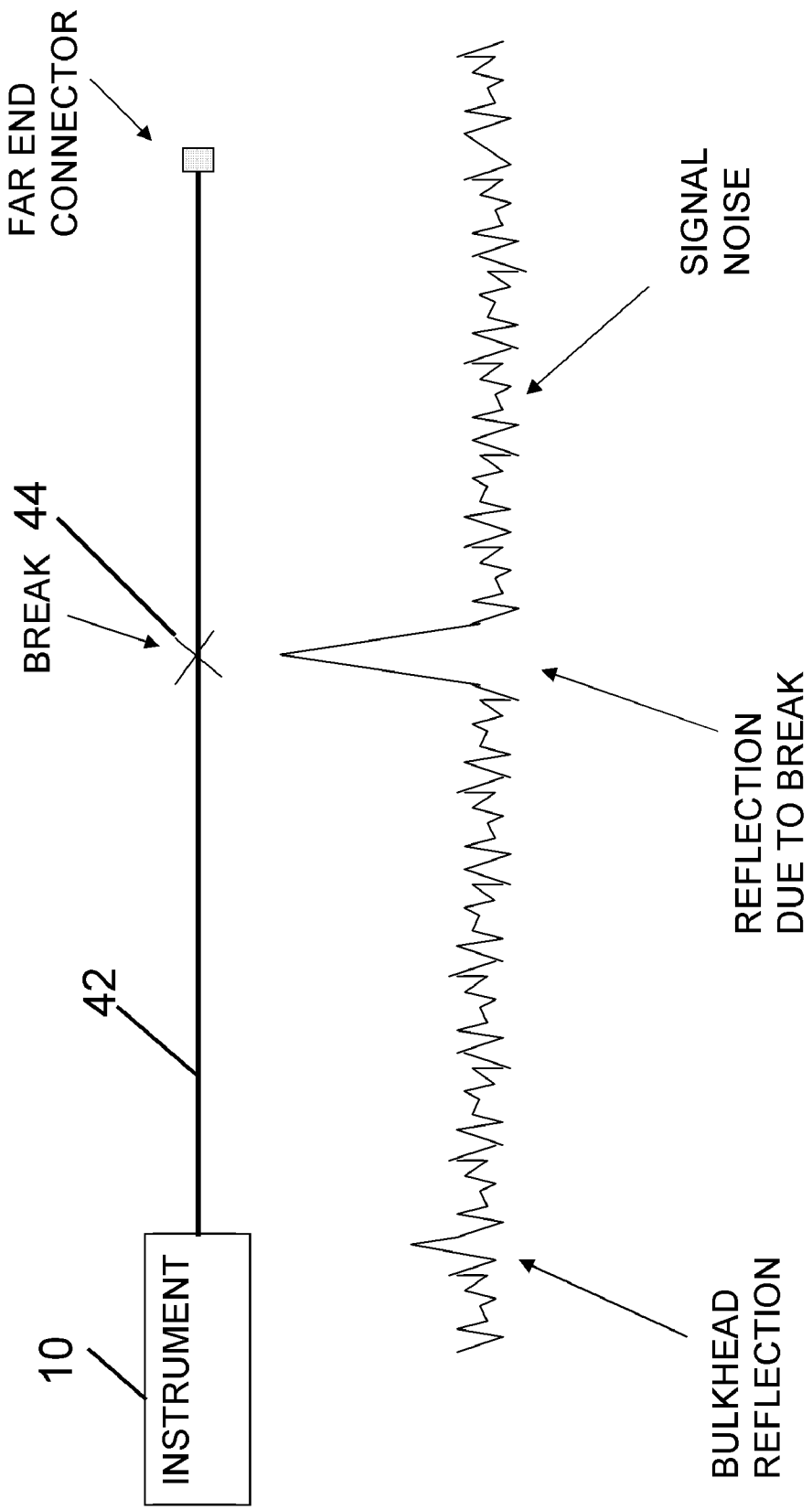
FIG. 2 is a diagram illustrating the instrument connected to a fiber with a break in the middle and the resulting signal using a 5 ns pulse and the pre amplifier set for low gain.

Referring now to FIG. 2, the instrument is shown connected to a fiber 42 with a break 44 in the middle and the resulting signal from launching a 5 ns pulse from the instrument to the fiber 42, with the pre amplifier set for low gain. In this case there is no measurable backscatter.

Figure 3:
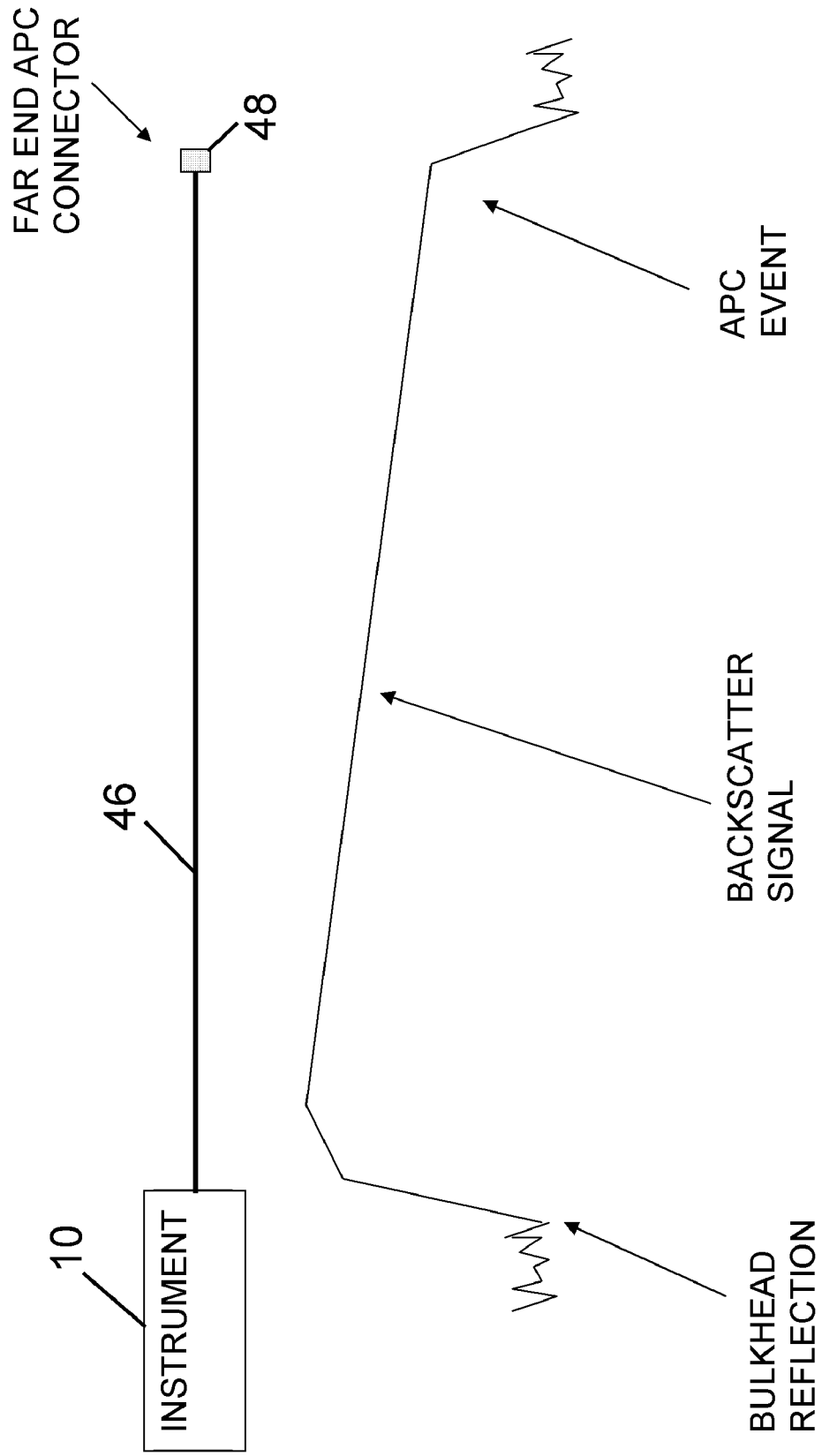
FIG. 3 is a diagram of the instrument shown connected to an intact fiber but with an open APC connector on the far end using a 500 ns pulse and the pre amplifier set for high gain.

In FIG. 3, the instrument 10 is shown connected to an intact fiber 46 but with an open APC connector 48 on the far end. A 500 ns pulse is launched into the fiber 46 and the pre amplifier is set for high gain. In this case there is measurable backscatter and the APC open can be discovered.

Figure 4:
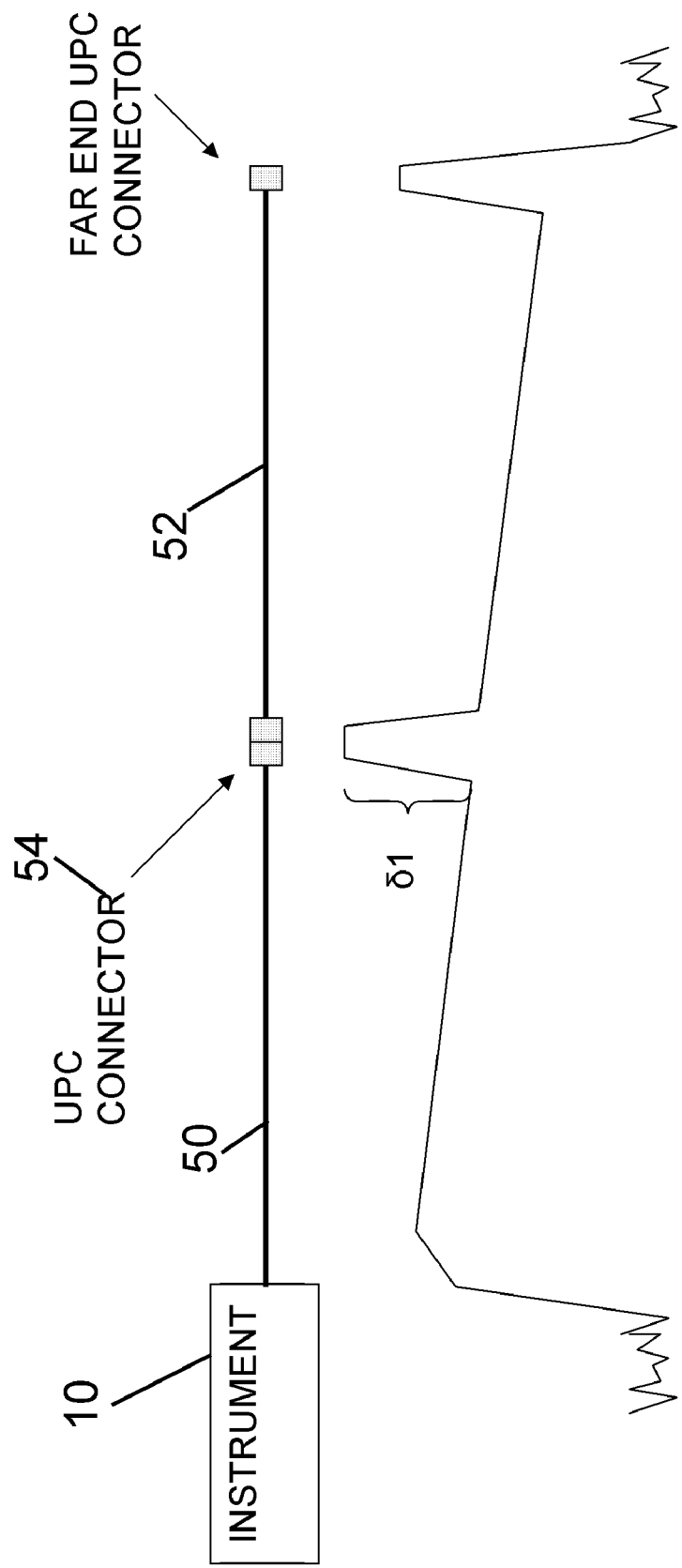
FIG. 4 is a diagram illustrating calibration of the instrument performed using two lengths of singlemode fiber to establish a high gain value.

In FIG. 4, calibration of the instrument 10 is performed using two lengths 50, 52 of singlemode fiber, such as 100 meters each, connected by a connector 54 (a UPC connector in the illustration) having a reasonably low reflectance so that the signal is not saturated when making a measurement. The pre amplifier 26 is set for high gain and the widest pulse width is used to stimulate as much backscatter as possible. δ1 is measured and the reflectance is calculated using, $$R = B_{ns} + 10 \log[(10^{H/5} - 1) * PW] \qquad \text{Equation 1}$$

where R is the know reflectance, $B_{ns}$ is the backscatter coefficient for 1310 nm at 1 ns, H is the height of the reflection above the backscatter level, and PW is the pulse width. This is the basic equation used in an OTDR to calculate an event reflectance. This measurement establishes the high gain value.

Figure 5:
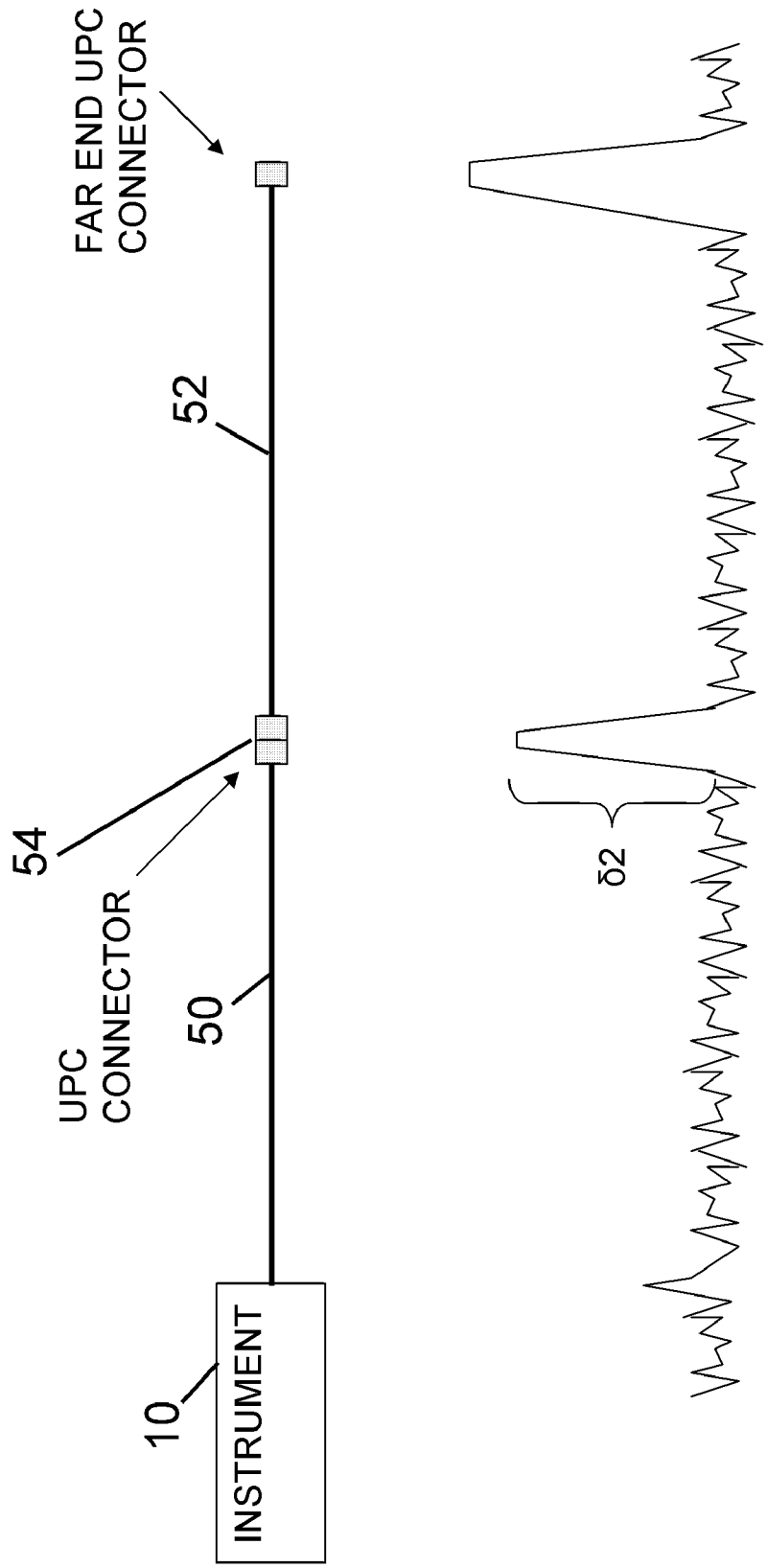
FIG. 5 is a diagram illustrating calibration of the instrument performed using two lengths of singlemode fiber to establish a low gain value.

Next, referring to FIG. 5, the pre amplifier 26 gain is reduced to low gain using the same pulse width as previously. The result shows a reflection among ground noise. A measurement of δ2 is made on the same reflection of known magnitude as in FIG. 4. This measurement establishes the low gain value and allows a high amplitude pulse to be measured within the amplifiers linear region. The value of H is unknown during this measurement because there is no backscatter to reference but the reflectance has not changed.

Figure 6:
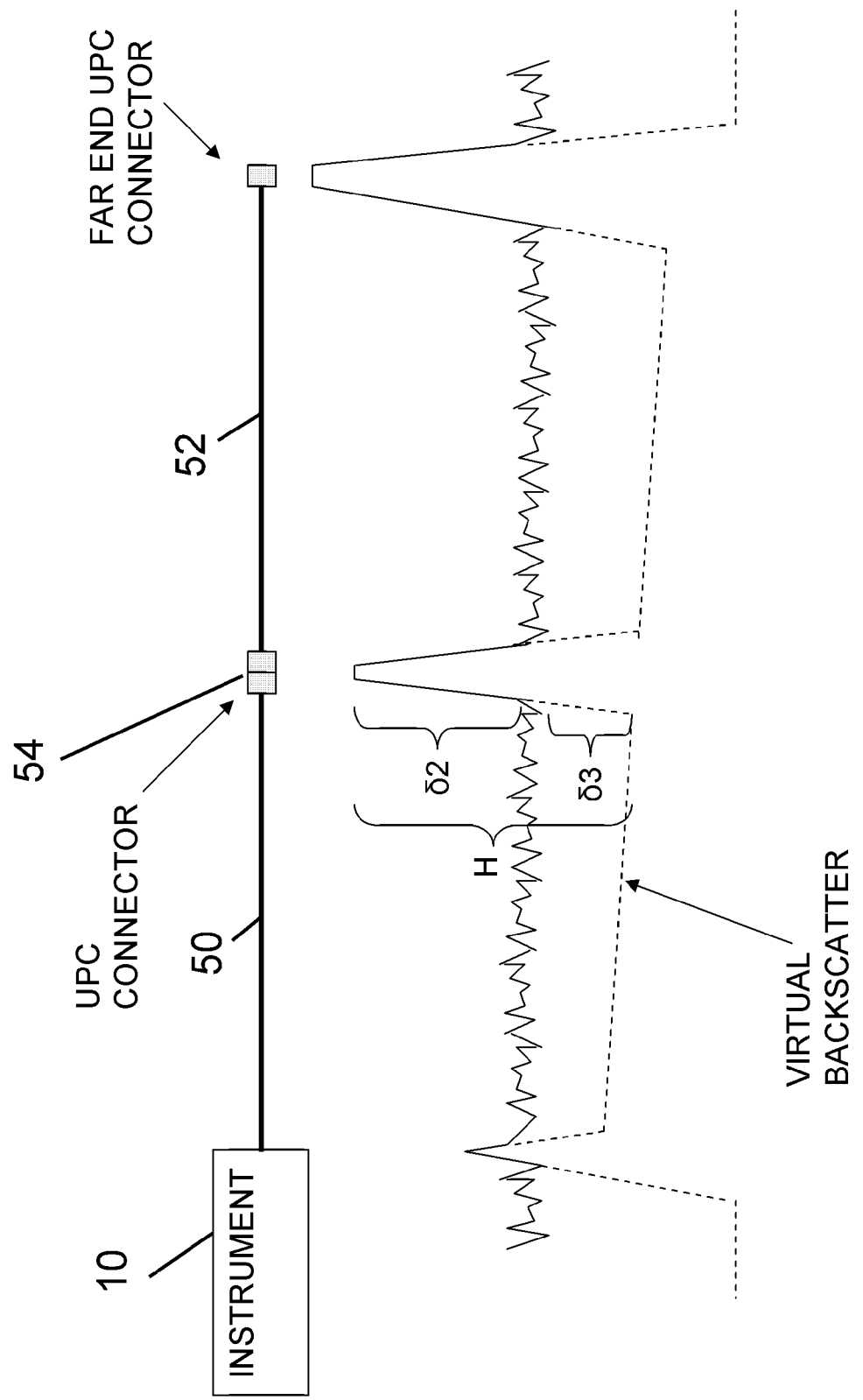
FIG. 6 is a diagrammatic representation of an actual signal showing δ2 and the virtual backscatter signal showing δ3.

In FIG. 6, a representation of the actual signal showing δ2 and the virtual backscatter signal showing δ3 is depicted. Since the calibrated reflectance is known using equation 1 and all the other parameters are know, H can be solved. Now that H is known, δ3 can be solved and stored in memory using, $$H = \delta_2 + \delta_3 \quad \text{Equation 2}$$

Since δ3 is stored in memory, testing an unknown reflectance in the field relies on measuring δ2, calculating H, and solving for the reflectance equation 1 since $B_{ns}$, H, δ2, δ3, and pulse width are known. This method negates the need to measure the actual gain ratios of the pre amplifier electronically.

Accordingly, the instrument fills the need for an easy to use, low cost, high resolution, palm-size instrument for testing singlemode PON networks between the customer and the first distribution point that provides connectivity information or the location of an open. Since the range needed is short and it does not need to test through the splitter, less dynamic range is needed, so lower cost components (e.g. a PIN photodiode) can be used. Single wavelength operation, simplified electronics, reduced signal averaging, and reduced processing also lower the cost. It can also perform live fiber detect prior to diagnostics.

Figure 7:
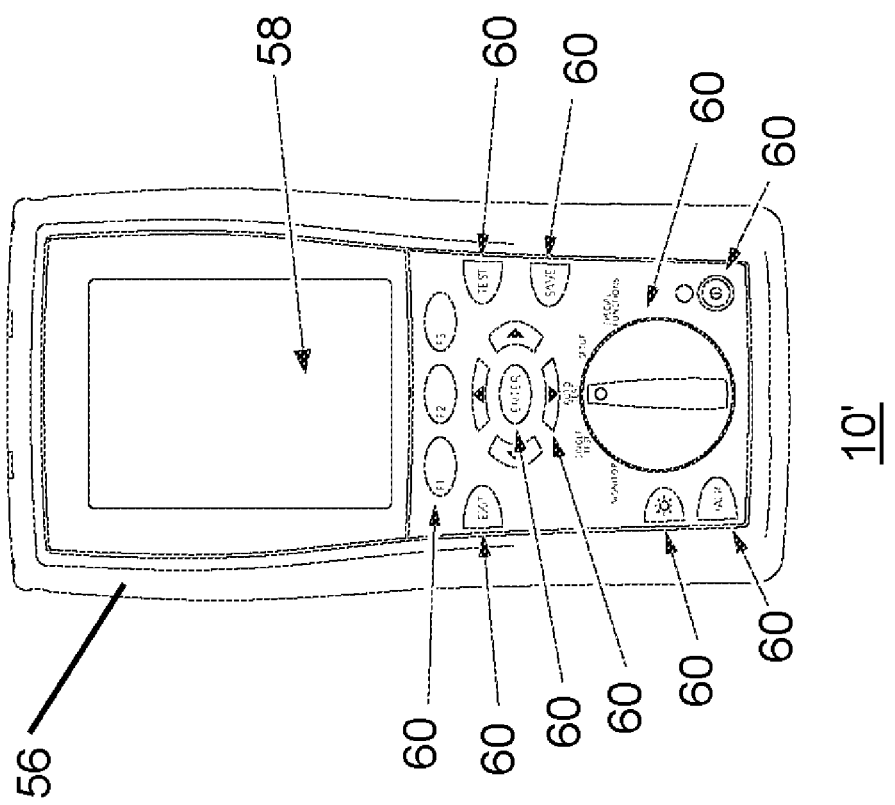
FIG. 7 is a view of the instrument provided in a hand-held form.

The instrument is suitably provided in a hand-held form, for example as in FIG. 7, wherein test instrument 10' comprises a case 56 sized for holding in a user's hand, a display 58, and user input controls 60 which may comprise cursor control keys, buttons and selector knobs, for example.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An instrument for examining a single mode optical fiber under test wherein optical pulses are input into the single mode optical fiber under test and a return optical signal is received from the single mode optical fiber under test, the instrument comprising:
   - a low power, long wavelength optical power source for generating the optical pulses;
   - an optical detector compatible with the low power, long wavelength optical power source for receiving the return optical signal from the single mode optical fiber under test;
   - a singlemode optical coupler having two input ports and one output port, the optical pulses from the optical power source being transmitted at one input port and coupled to an output singlemode optical fiber connected to the output port, and the return optical signal being received at the second input port and coupled to the optical detector, the singlemode optical coupler equally dividing the optical power from the optical source and the return optical signal between the associated output port and input ports;
   - an optical delay element between the output port of the singlemode optical coupler and an output fiber such that electrical switching noise due to the laser trigger is separated from the first returned optical pulse;
   - an optical receiver comprised of a bandwidth operational amplifier configured to operate under two diverse gain settings, one for high gain and sensitivity, and one for low gain and high bandwidth;
   - at least one microprocessor for controlling the electronics, acquiring the signals, and processing the signals;
   - a display for reporting the live fiber results and distances to reflections and fiber ends.

2. The instrument of claim 1 wherein the low power, long wavelength optical power source is a laser diode having an optical output of 1310 nanometers.

3. The instrument of claim 1 wherein the optical detector is a low cost, high-speed InGaAs PIN device producing substantially no internal current gain.

4. The instrument of claim 1 wherein the singlemode optical fiber coupler having input ports and output port is a 50/50 coupling ratio device with at least 2 meters of fiber between the coupler and output port.

5. The instrument of claim 1 wherein the receiver is a high-speed op amp whose internal voltage clamping prevents pulse spreading such that high resolution is maintained, a large feedback resistor for high amplification of backscatter signals needed to locate non reflective APC, and a low value feedback resistor to maintain high spatial resolution between reflective events.

6. The instrument of claim 5, wherein said large feedback resistor comprises 200 k ohms.

7. The instrument of claim 5, wherein said large feedback resistor comprises 4 k ohms.

8. The instrument of claim 1 wherein the receiver is activated while the laser pulse is in the off state so that any traffic present on the fiber cable can be detected by the receiver so that cabling with traffic will not be interrogated by a laser pulse.

9. The instrument of claim 1 wherein said instrument is calibrated when making reflectance measurements without backscatter by comparing and calculating the differences between a known reflection using backscattering and unknown reflection without backscattering and using the backscattering reflection equation $R = B_{ns} + 10 \log[(10^{H/5} - 1) * PW]$ and amplifier gain ratio to determine the unknown reflectance value.

10. The instrument of claim 1, wherein said optical receiver tests for live fiber traffic prior to running a diagnostic test.

11. The instrument of claim 1, wherein said optical delay element comprises a length of single mode optical fiber.

12. A method of examining a single mode optical fiber under test wherein optical pulses are input into the single mode optical fiber under test and a return optical signal is received from the single mode optical fiber under test, the instrument comprising:
   - providing a low power, long wavelength optical power source for generating the optical pulses;
   - providing an optical detector compatible with the low power, long wavelength optical power source for receiving the return optical signal from the single mode optical fiber under test;
   - providing a singlemode optical coupler having two input ports and one output port, the optical pulses from the optical power source being transmitted at one input port and coupled to an output singlemode optical fiber connected to the output port, and the return optical signal being received at the second input port and coupled to the optical detector, the singlemode optical coupler equally dividing the optical power from the optical source and the return optical signal between the associated output port and input ports;
   - providing an optical delay between the output port of the singlemode optical coupler and an output fiber to create optical delay such that electrical switching noise due to the laser trigger is separated from the first returned optical pulse;
   - providing an optical receiver comprised of a bandwidth operational amplifier configured to operate under two diverse gain settings, one for high gain and sensitivity, and one for low gain and high bandwidth;

providing at least one microprocessor for controlling the electronics, acquiring the signals, and processing the signals;

providing a display for reporting the live fiber results and distances to reflections and fiber ends.

13. The method of claim 12, wherein the low power, long wavelength optical power source is a laser diode having an optical output of 1310 nanometers.

14. The method of claim 12, wherein the optical detector is a low cost, high-speed InGaAs PIN device producing substantially no internal current gain.

15. The method of claim 12, wherein the singlemode optical fiber coupler having input ports and output port is a 50/50 coupling ratio device with at least 2 meters of fiber between the coupler and output port.

16. The method of claim 12, wherein the receiver is a high-speed op amp whose internal voltage clamping prevents pulse spreading such that high resolution is maintained, a large feedback resistor for high amplification of backscatter signals needed to locate non reflective APC, and a low value feedback resistor to maintain high spatial resolution between reflective events.

17. The method of claim 12, wherein said large feedback resistor comprises 200 k ohms.

18. The method of claim 12, wherein said large feedback resistor comprises 4 k ohms.

19. The method of claim 12, wherein the receiver is activated while the laser pulse is in the off state so that any traffic present on the fiber cable can be detected by the receiver so that cabling with traffic will not be interrogated by a laser pulse.

20. The method of claim 12, wherein a calibration method is used when making reflectance measurements without backscatter by comparing and calculating the differences between a known reflection using backscattering and unknown reflection without backscattering and using the backscattering reflection equation $R = B_{ns} + 10 \log[(10^{H/5} - 1) * PW]$ and amplifier gain ratio to determine the unknown reflectance value.

21. The method of claim 12, wherein said optical receiver tests for live fiber traffic prior to running a diagnostic test.

22. The method of claim 12, wherein said providing an optical delay comprises providing a length of single mode optical fiber attached to the output port of the singlemode optical coupler and the output fiber connector.

* * * * *